United States Patent [19]

de Brie Perry

[11] Patent Number: 4,691,592
[45] Date of Patent: Sep. 8, 1987

[54] CONTINUOUSLY-VARIABLE RATIO TRANSMISSION

[75] Inventor: Forbes G. de Brie Perry, Charlbury, England

[73] Assignee: National Research Development Corporation, London, England

[21] Appl. No.: 672,897

[22] Filed: Nov. 19, 1984

[30] Foreign Application Priority Data

Nov. 17, 1983 [GB] United Kingdom ................. 8330682

[51] Int. Cl.$^4$ ....................... F16H 37/06; F16H 15/50
[52] U.S. Cl. ..................................... 74/691; 74/740; 74/682; 74/721; 74/796
[58] Field of Search ................. 74/740, 691, 695, 773, 74/772, 791, 690, 796, 721, 790, 770, 689, 681, 682

[56] References Cited

U.S. PATENT DOCUMENTS

| | | | |
|---|---|---|---|
| 2,930,257 | 1/1955 | Christenson | 74/681 |
| 3,031,901 | 5/1962 | Simpson | 74/770 |
| 3,406,597 | 10/1968 | Perry . | |
| 4,272,999 | 6/1981 | Perry . | |
| 4,297,918 | 11/1981 | Perry | 74/690 |
| 4,499,782 | 2/1985 | Perry . | |

FOREIGN PATENT DOCUMENTS

| | | | |
|---|---|---|---|
| 0084724 | 8/1983 | European Pat. Off. | 74/691 |
| 0028343 | 3/1981 | Japan | 74/691 |
| 2100372 | 12/1982 | United Kingdom | 74/691 |
| 2136893 | 3/1983 | United Kingdom . | |

Primary Examiner—Leslie Braun
Assistant Examiner—Martin G. Belisario
Attorney, Agent, or Firm—Cushman, Darby & Cushman

[57] ABSTRACT

A continuously-variable ratio automotive transmission, especially of the toroidal race rolling-traction type, in which mechanism comprising a clutch, a brake and two epicyclics—a reversing train and a mixing train—is interposed between the ratio-varying unit and the output member of the transmission as a whole. By operation of the clutch and the brake the elements within the mechanism may be arranged in two different combinations whereby the transmission may operate in first and second "regimes", one or other of which will offer efficient transmission throughout the entire operating range of the source of automotive power. The invention lies in a particular choice of the two different combinations resulting firstly in a transmission notably short in axial length. Secondly in the feature that in the regime including the reverse and lower forward speeds of the output member, power is transmitted to it from the variator through the full gearing of the two epicyclic trains, the planet carrier of the reversing train then being locked by a connected braking arm which lies parallel to the transmission axis and reaches its point of anchorage by passing through the middle of an annular gear which constitutes the output member.

5 Claims, 1 Drawing Figure

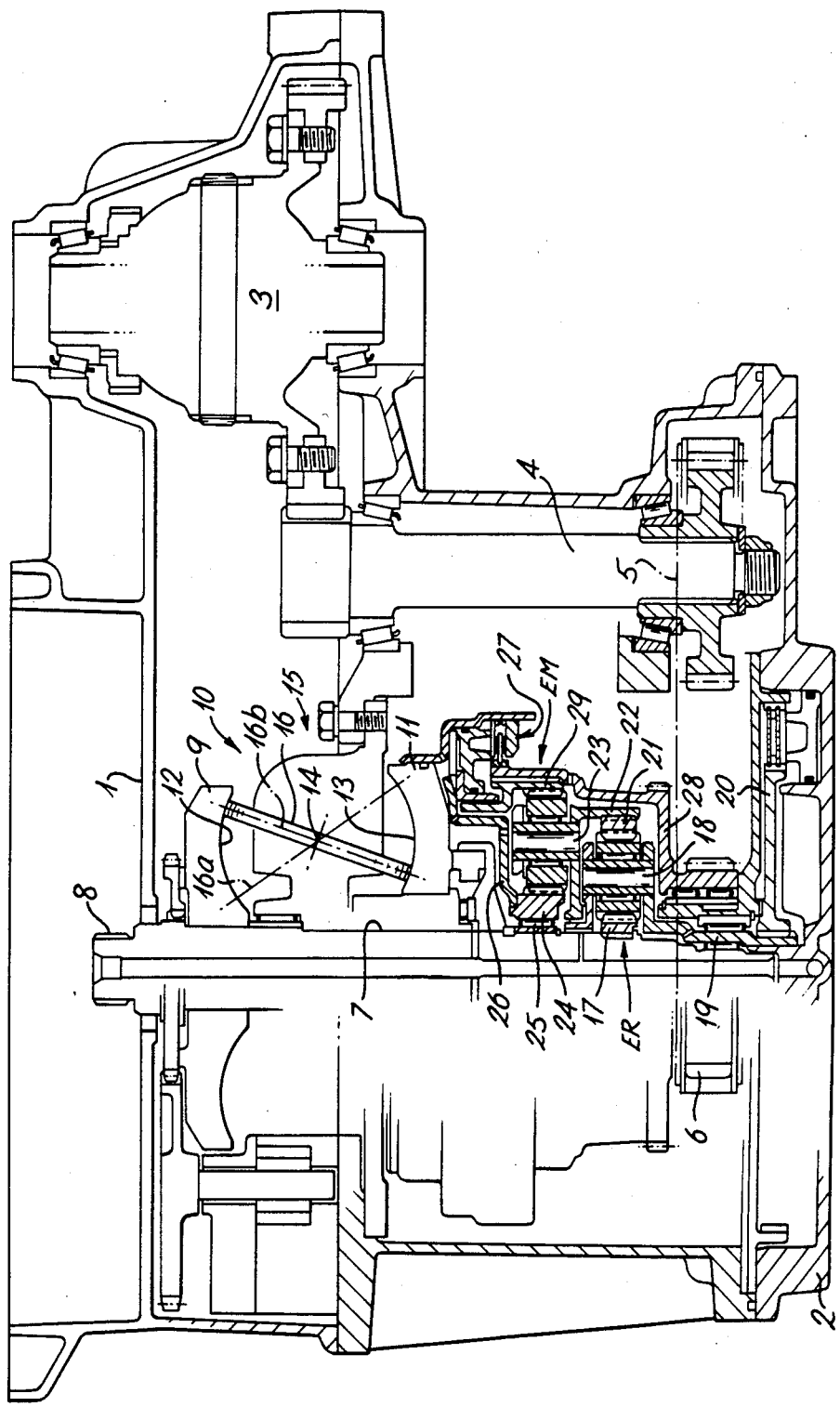

CONTINUOUSLY-VARIABLE RATIO TRANSMISSION

This invention relates to continuously-variable ratio transmissions, of the kind suitable for instance to connect the prime mover of an automobile vehicle to the driven wheels. It relates especially to the known class of such continuously-variable transmissions the operation of which can be divided clearly into two distinct phases or "regimes", the operation of which and relationship between which will now be explained. Assume that the input to the transmission is being driven by the prime mover at constant speed and that the first regime is in operation, with the ratio-varying unit—or "variator"—of the transmission set to one extreme position. Typically the output or final member of the transmission will now be rotating in its reverse direction, and at maximum speed. If the setting of the variator is now progressively changed so as to approach the opposite extreme, typically the output member speed will progressively fall until a condition is achieved, before that opposite extreme is reached, at which the output speed is zero, at which stage the setting of the transmission is commonly known as "geared idle". As the setting of the variator then continues to progress to the extreme, the output begins to rotate in the forward direction with increasing speed. If the second regime is then connected in place of the first, and the setting of the variator is progressively changed back to the first extreme, the output remains in the forward sense and increases steadily to maximum forward speed.

The invention applies particularly to transmissions of the so-called toroidal race rolling traction type, of which UK Pat. No. 1078791 shows an example, in which the variator comprises an input disc which is rotated by the prime mover and which has a coaxial toroidal race formed on one face. The output of the variator includes a coaxial output disc formed with a similar and confronting toroidal race, the surfaces of the two races together forming part of the surface of a single imaginary torus. Traction is transmitted from the input to the output disc by means of sets of rollers, each of which contacts both races and is mounted to rotate with its centre substantially tangential to the torus centre circle, and with its axis of rotation intersecting the common axis of the two discs. By altering the setting of the rollers so that their centres remains on the torus centre circle but so that their axes of rotating intersect the discs axis at a different point, the ratio between the speeds of the input and output discs, and thus the ratio transmitted by the ratio transmission unit as a whole, is varied. In UK Pat. No. 1078791, as in other known transmissions of this kind, an adjustable mechanism including gears connects the final member of the transmission both to the variator output disc and, by means of not including the rollers, to the input from the prime mover also. In one arrangement of the mechanism the transmission is in its first regime, and alteration of the setting of the rollers by rotating them about axes substantially tangential to the torus centre circle from a first extreme position to the second and opposite extreme causes the output of the transmission to change progressively from full reverse through "geared idle" to slow forward as already described. The mechanism and its gearing are so designed that if their arrangement is then changed so as to put the transmission into its second regime, with the rollers remaining at the second extreme of their travel, there is no instantaneous change in the speed of the final member: such a change is known in the art as a "synchronous change". If the transmission remains in this regime and the rollers are then progressively rotated back to the first extreme of their travel, the rotation of the final member remains in the forward sense and progressively increases in speed.

The present invention seeks to provide a two-regime continuously-variable ratio transmission in which the mechanism connecting the variator to the final member is novel and has the potential advantages at least of relatively low speeds of the important gearing elements, short axial length, and relatively direct and gear-free connection between the variator and the final member in the second regime during which, of course, the final member reaches its highest speed. According to the invention a continuously-variable ratio transmission capable of working in two regimes includes two parts. The first part comprises a variator having an input (of velocity I) connectable to a prime mover, and an output (of velocity V). The input of the second part, which includes two epicyclics (ER and EM), is connected to both the input and the output of the variator, and the output of the second part is connected to the output or final member of the transmission as a whole. The sun of ER is connected to I, and the annulus of ER is connectable to the planet carrier of EM. The final member is connected to the annulus of EM and is also connectable, by means of a clutch or the like, to V. A brake or the like is capable of anchoring the planet carrier of ER to ground. The arrangement is capable of operating so that in the first regime the clutch means is disengaged and the motion of the final member of the transmission reflects the geared motion of both ER and EM in response to inputs I and V which is then communicated to the final member by way of the annulus of EM, whereas in the second regime the clutch means is engaged so that the final member is connected directly to V, and the brake is released so that the planet carrier of ER imposes no restraint upon all other components of EM and ER which are therefore free to idle.

The planet carrier of ER may be permanently grounded, in which case there may be a second clutch-like member in the connection between the annulus of ER and the planet carrier of EM. Alternatively this connection may be rigid and the planet carrier of ER may be grounded by means of a releasable brake.

The variator may be of the toroidal race, rolling traction type and may be of the kind comprising only a single input disc and a single output disc, and the rotations of its input and output, of the planet carriers of ER and EM, and of the final member of the transmission may all be coaxial. In the second regime the connection via the clutch between variator output V and the final member may lie radially-exterior to both epicyclics, and the final member may be in the form of an annular gear so that the brake communicates with the planet carrier of ER through the interior of that annulus.

The invention is further defined by the claims and will now be described by way of example, with reference to the accompanying diagrammatic drawing which includes an axial section through a transmission, together with other associated parts shown in elevation.

The drawing shows part of an automobile comprising fixed framework and casing members 1, 2 supporting a final drive unit 3 connected by means of a layshaft 4 and toothed belt 5 to an annular gear 6 which constitutes the output or final member of the transmission unit according to this invention. The transmission input shaft 7 will in use be rotated at input velocity I by a prime mover (not shown) with which it will engage by means of gear 8. The input disc 9 of a toroidal race variator unit 10 is keyed to shaft 7, the corresponding output disc 11 is free to rotate about the shaft, and the confronting faces 12 and 13 of these discs form parts of the surface of an imaginary torus formed about a centre circle 14. A set of three rollers 16, of a kind well known in the art, is carried by the spider frame shown in outline at 15, and lines 16a and 16b illustrate two extreme settings to which the one illustrated roller 16 of the set may be moved, by mechanism of known kind which is itself no part of the present invention, to change the ratio transmitted by unit 10: reference 16a indicates an extreme setting in which the speed of rotation of output disc 11 will be a minimum relative to that of input disc 9, and reference 16b the opposite extreme in which the velocity of 11 relative to that of 9 will be a maximum.

Shaft 7 is keyed to the sun 17 of an epicyclic which will be referred to as the reversing epicyclic ER. The planet carrier 18 of ER is connected by a sleeve 19 and a brake 20 to the casing 2. The annulus 21 of ER is connected by a sleeve 22 to the planet carrier 23 of a second epicyclic which will be referred to as the mixing epicyclic EM. The sun 24 of this epicyclic is free to rotate around shaft 7 on bearings 25, and is connected by member 26 to the output disc 11 which is also connected, by way of a clutch 27 and a stepped tubular member 28, direct to final member 6. Member 28 is also keyed to the annulus 29 of EM.

When the transmission is operating in its first regime brake 20 is engaged and clutch 27 is disengaged: the operating mechanisms of the clutch and the brake are not shown but are well known in the art. Planet carrier 18 of epicyclic ER is therefore grounded, and receives input I from shaft 7 by way of sun 17. The output of ER is fed by way of annulus 21 and sleeve 22 to the planet carrier 23 of epicyclic EM, which also receives input V from output disc 11 by way of member 26 and sun 24. The output of epicyclic EM is transmitted by way of annulus 29 to member 28, and so to the output member 6 of the transmission and thus by way of belt 5 and layshaft 4 to the final drive 3. During this first regime, as the rollers move progressively from one extreme setting 16b to the opposite extreme 16a, the progressive variation of the ratio I/V is such that the rotary motion of final member 6, which begins at maximum reverse value, falls progressively to zero and then changes direction and has reached a predetermined value in the forward sense when the rollers 16 reach position 16a. Using criteria known in the art, the characteristics of epicyclic ER and EM and of their related parts are preferably so chosen that if at that point brake 20 is released and clutch 27 simultaneously engages, so that EM and ER now effectively idle and the drive is transmitted direct to member 6 from disc 11 by way of clutch 27 and member 28, there is no change in the overall ratio transmitted by the transmission unit and thus no instantaneous change to the speed of revolution of member 6: such a change, as has already been mentioned, known in the art as a "synchronous change" into the second regime during which the reverse motion of the rollers 16 back from position 16a to the original extreme position 16b results in a steady increase in the speed of forward rotation of member 6.

What is claimed is:

1. A continuously-variable ratio transmission capable for working in two regimes and having a casing and including:
   a final output member;
   first and second parts; said first part including a variator comprising a unit operable to vary the transmitted ratio in a stepless manner, having an input connectable to a prime mover and an output;
   said second part including an input and an output and two epicyclic trains disposed between said second part input and output, each of said trains respectively comprising a sun member, a planet carrier and an annulus, said planet carrier of each of said respective epicyclic trains carrying a single planet gear in engagement both with said sun member of its respective train and with said annuluar of its said respective train;
   said second part input being connected to both said input and said output of said first part and said second part output being connected to said first member;
   said sun member of one of said trains being permanently connected to said second part input and said annulus of said one train being connected to said planet carrier of said other train;
   a first clutch member;
   said final output member being connected to said annulus of said other train and being connectable by means of said clutch member to said first part output and anchoring means being provided whereby said planet carrier of said one train is capable of being anchored to said casing;
   whereby said transmission is capable of operating so that in said first regime said first clutch member is disengaged, with said planet carrier of said one train being anchored to said casing and the motion of said final output member reflects the geared motion of both said trains in response to both said first part's input and output transmitted to said final output member by way of said annulus of said other of said trains, whereas in said second regime said first clutch member is engaged so that said final output member is connected directly to said second part output, and said anchoring means are released so that said planet carrier of said one train imposes no restraint upon other components of said trains which are thereby free to idle.

2. A continuously-variable ratio transmission according to claim 1 in which said anchoring means for said planet carrier of said one train is in the form of a brake or the like and is releasable, and in which said connection between said annulus said one train and said planet carrier of said other train is permanent.

3. A continuously-variable ratio transmission according to claim 1 in which said variator is of the toroidal race, rolling traction type.

4. A continuously-variable ratio transmission according to claim 3 in which said variator is of the kind comprising only a single input disc and a single output disc, and in which the rotations of said two discs, of said planet carriers of said trains and of said final output member of said transmission are all coaxial.

5. A continuously-variable ratio transmission according to claim 2 in which said connection by way of said first clutch member between said first pait output and said final output member lies radially-exterior to both of said two epicyclic trains, and in which said final output member is in the form of an annular gear so that the anchoring means communicates with said planet carrier of said one train through the interior of said annular gear.

* * * * *

UNITED STATES PATENT AND TRADEMARK OFFICE
CERTIFICATE OF CORRECTION

PATENT NO. : 4,691,592

DATED : September 8, 1987

INVENTOR(S) : Forbes G. de Brie Perry

It is certified that error appears in the above-identified patent and that said Letters Patent is hereby corrected as shown below:

IN THE SPECIFICATION

Col. 3, line 56, "engages" should read -- engaged --.

IN THE CLAIMS

Col. 4:

Claim 1, line 16, "annuluar" should read -- annulus --;

line 20, "first" should read -- final --.

Claim 2, line 5, after "annulus" insert -- of --.

Signed and Sealed this

Eighteenth Day of October, 1988

Attest:

DONALD J. QUIGG

*Attesting Officer*  *Commissioner of Patents and Trademarks*